United States Patent
Gady et al.

(10) Patent No.: US 8,510,024 B2
(45) Date of Patent: Aug. 13, 2013

(54) MODEL-BASED DIAGNOSTIC METHOD AND SYSTEM FOR A SELECTIVE REDUCTION CATALYST DEVICE IN A VEHICLE

(75) Inventors: Kevin Gady, Ypsilanti, MI (US); Min Sun, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 307 days.

(21) Appl. No.: 12/878,357

(22) Filed: Sep. 9, 2010

(65) Prior Publication Data

US 2012/0060469 A1    Mar. 15, 2012

(51) Int. Cl.
*G06G 7/70*    (2006.01)

(52) U.S. Cl.
USPC ............................................. 701/114; 60/277

(58) Field of Classification Search
USPC ................................................. 701/107, 109
See application file for complete search history.

(56) References Cited

U.S. PATENT DOCUMENTS

| | | | | |
|---|---|---|---|---|
| 7,054,769 B2 * | 5/2006 | Cox | ................................. | 702/60 |
| 7,680,587 B2 * | 3/2010 | Elfvik | ........................... | 701/114 |
| 8,140,248 B2 * | 3/2012 | Mehendale et al. | ........... | 701/114 |

FOREIGN PATENT DOCUMENTS

DE    10347130 A1    6/2004

* cited by examiner

*Primary Examiner* — Stephen K Cronin
*Assistant Examiner* — Elizabeth Hadley
(74) *Attorney, Agent, or Firm* — Quinn Law Group, PLLC

(57) ABSTRACT

A vehicle includes an engine, an exhaust system having a selective catalytic reduction (SCR) device, a NOx sensor, and first and second controllers. The first controller compares estimated NOx levels from an SCR model to actual levels from the sensor, and updates the SCR model when the values differ from each other. The second controller evaluates an updating frequency of the SCR model, and executes a control action when the frequency is excessive. A control system includes the sensor and two controllers noted above. A method of diagnosing the exhaust system includes measuring NOx gasses downstream of the SCR device, updating the SCR model when the deviation is present between estimated and measured NOx levels, comparing estimated ammonia ($NH_3$) storage levels from the SCR model to modeled or estimated upper and lower $NH_3$ storage level boundaries to determine excessive updating, and setting a diagnostic code when excessive updating is present.

16 Claims, 1 Drawing Sheet

MODEL-BASED DIAGNOSTIC METHOD AND SYSTEM FOR A SELECTIVE REDUCTION CATALYST DEVICE IN A VEHICLE

TECHNICAL FIELD

The invention relates to a model-based method and system for diagnosing the performance of a selective reduction catalyst in a vehicle.

BACKGROUND

In a vehicle powered by a diesel or a direct injection-type internal combustion engine, a particulate filter is positioned within the exhaust stream to capture microscopic particles of soot, ash, sulfates, metallic particles, and/or any other matter. Filter regeneration occurs when the temperature of the exhaust gas passing through the filter is temporarily elevated above a threshold of at least approximately 450 degrees Celsius. The exhaust stream may be further cleansed using a selective catalytic reduction device, which is specially designed to convert nitrogen oxides or NOx gasses into water and nitrogen as additional inert byproducts.

SUMMARY

A vehicle is disclosed herein that includes an engine, an exhaust system having a selective catalytic reduction (SCR) device which receives exhaust gas from the engine and reduces nitrogen oxide (NOx) gasses in the exhaust gas, a NOx sensor, a first controller, and a second controller. The NOx is cross-sensitive to ammonia ($NH_3$) which escapes the SCR device, and therefore the NOx sensor can measure NH3 and interpret the readings as NOx. As a result, the downstream signal can be particularly noisy.

The NOx sensor determines actual level of NOx gasses downstream of the SCR device, and the first controller has an SCR model which provides a set of output values including an estimated level of NOx gasses downstream of the SCR device. The first controller also compares the estimated level of NOx gasses from the SCR model to the actual level from the NOx sensor, and automatically updates the SCR model when the estimated and measured levels differ from each other. The second controller diagnoses an operation of the exhaust system by automatically evaluating an updating frequency of the SCR model by the first controller with respect to a calibrated threshold. The second controller can then set a diagnostic code or execute another suitable control action when the updating frequency is determined to be excessive relative to the calibrated threshold.

A control system is also provided for a vehicle having an internal combustion engine and an SCR device which receives exhaust gas from the engine and reduces a level of $NO_x$ gasses in the exhaust gas. The control system includes the first controller with the SCR model, and the second controller which evaluates the updating frequency of the SCR model with respect to a calibrated threshold, e.g., $NH_3$ storage levels provided by each of an upper and a lower $NH_3$ boundary model. The second controller sets a diagnostic code or executes another suitable control action whenever excessive updating of the SCR model is diagnosed by the second controller.

A method of diagnosing performance of an exhaust system in a vehicle having an engine, a NOx sensor, a first controller, and a second controller includes measuring levels of NOx gasses downstream of the SCR device, estimating levels of NOx gasses using an SCR model and the first controller, and comparing the estimated level of NOx gasses from the SCR model to the actual levels of NOx gasses from the NOx sensor using the first controller. The method further includes updating the SCR model when the estimated and actual levels of NOx gasses differ from each other, and using the second controller to diagnose an operation of the exhaust system by automatically evaluating and updating frequency of the SCR model by the first controller with respect to a calibrated threshold. The method also includes executing a control action when the updating frequency is evaluated by the second controller as being excessive relative to the calibrated threshold.

The above features and advantages and other features and advantages of the present invention are readily apparent from the following detailed description of the best modes for carrying out the invention when taken in connection with the accompanying drawings.

DESCRIPTION

Figure 1:
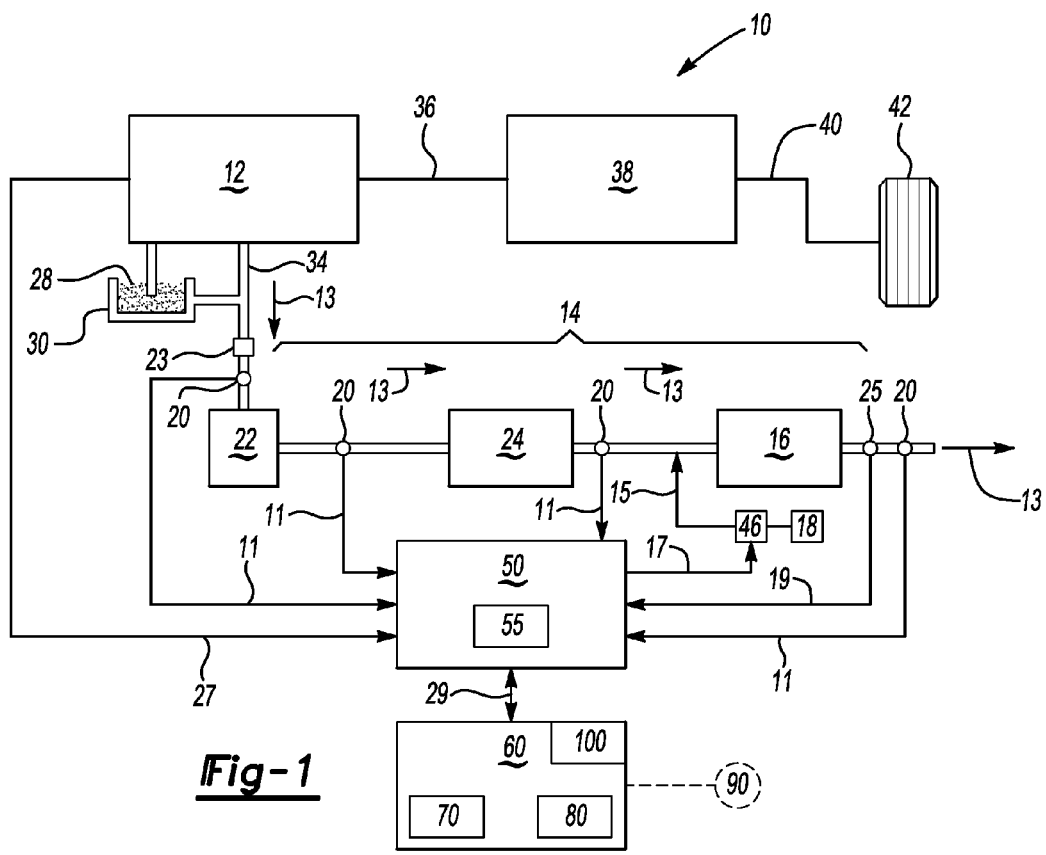
FIG. 1 is a schematic illustration of a vehicle having an exhaust system with a selective catalytic reduction device (SCR) and an SCR model as disclosed herein.

Referring to the drawings wherein like reference numbers represent like components throughout the several figures, a vehicle 10 is shown in FIG. 1. The vehicle 10 has an engine 12, e.g., a diesel or direct injection-type internal combustion engine, which generates exhaust gas 13 during the fuel combustion process. The exhaust gas 13 passes into and through an exhaust system 14 before being discharged to atmosphere.

The exhaust system 14 includes a selective catalytic reduction (SCR) device 16. SCR device 16 converts nitrogen oxides, i.e., NOx gasses, into water and nitrogen as inert byproducts using an active catalyst. The SCR device 16 may be configured as a ceramic brick or a ceramic honeycomb structure, a plate structure, or any other suitable design having a sufficient thermal mass. NOx gasses in exhaust gas 13 react with ammonia ($NH_3$) stored in the SCR device 16, thereby reducing levels of NOx gasses in the exhaust gas before the exhaust gas is discharged into the surrounding atmosphere.

Vehicle 10 includes a control system comprised of a NOx sensor 25 and respective first and second controllers 50 and 60, each being configured as a host machine or processor. The first controller 50 includes an updatable SCR model 55 as explained below, which is continuously adapted, corrected, or otherwise updated by the first controller. The second controller 60 includes an algorithm 100 for diagnosing an operation of the exhaust system 14 by evaluating the updating frequency of the SCR model 55 by the first controller 50. For example, second controller 60 may generate and apply respective upper and lower boundary models 70 and 80 to provide a calibrated threshold against which the second controller can evaluate the updating frequency of the SCR model 55. In one embodiment, the boundary models 70 and 80 may be modeled or estimated $NH_3$ storage levels for the SCR device 16, with neither of the boundary models being updatable unlike the SCR model 55.

In particular, the second controller 60 generates a calibrated threshold such as the upper and lower boundaries for $NH_3$ levels stored in the SCR device 16, with actual $NH_3$ levels in the SCR device ultimately generated by an injection of urea 15, i.e., $(NH_2)_2CO$, from a fluid reservoir 18 containing the urea. Injection of urea 15 occurs upstream of the SCR device 16 in response to dosing signals 17, e.g., from controller 50, and is performed using suitable urea dosing control hardware 46. Reductants such as $NH_3$ are difficult and costly to transport in raw form, and therefore urea 15, which is easy and relatively inexpensive to transport, can be used aboard vehicle 10. The urea 15 breaks down into $NH_3$ in the presence of heat, with the $NH_3$ then stored within the SCR device 16 for use in reducing NOx gasses into inert byproducts.

The respective first and second controllers 50 and 60 used to evaluate the exhaust system 14 may be configured as a general-purpose digital computer or as a proportional-integral-derivative (PID) controller device in communication with each of a plurality of temperature sensors 20, and generally comprising a microprocessor or a central processing unit (CPU), read-only memory (ROM), random access memory (RAM), electrically programmable read only memory (EPROM), a high speed clock, analog-to-digital (A/D) and/or digital-to-analog (D/A) circuitry, and any input/output circuitry or devices, as well as any appropriate signal conditioning and buffer circuitry. Algorithm 100 and any required reference calibrations are stored within the second controller 60 or are otherwise readily executed by the second controller in order to diagnose performance of the exhaust system 14.

Second controller 60 is in communication with the first controller 50 via communication channels 29, and with an optional indicator device 90 described below with reference to FIG. 2. Also, while the second controller 60 is shown as a separate device from first controller 50 for illustrative clarity, some or all of the structure of the second controller may be in common with that of the first controller if so desired. That is, separateness of functionality of the two controllers 50 and 60 is intended, and not necessarily separateness of structure.

In addition to the SCR device 16, the exhaust system 14 may include an oxidation catalyst 22 and a particulate filter 24. The order of the SCR device 16, oxidation catalyst 22, and particulate filter 24 may vary, e.g., with the oxidation catalyst preceding the SCR device, and the SCR device preceding the particulate filter. In various possible embodiments, the particulate filter 24 can be configured as ceramic foam, metal mesh, pelletized alumina, and/or any other suitable material or combination of materials. Particulate filter 24 is connected to or formed integrally with the oxidation catalyst 22, with the oxidation catalyst in communication with a fuel injector device 23 operable for delivering an amount of fuel 28 from a fuel tank 30 into the oxidation catalyst or into the exhaust gas 13 for subsequent ignition to increase the temperature of the exhaust gas during regeneration of the particulate filter.

Still referring to FIG. 1, the first controller 50 receives temperature signals 11 from the various temperature sensors 20 positioned within the exhaust system 14, including a sensor directly downstream of oxidation catalyst 22 and another sensor directly upstream of particulate filter 24. The first controller 50 is in communication with the engine 12 to receive additional operating signals 27 that identify the operating point of the engine, such as throttle position, engine speed, accelerator pedal position, fueling quantity, requested engine torque, etc., all of which may be used as inputs to control operation of the exhaust system 14.

Combustion of fuel 28 generates the exhaust gas 13, which is subsequently discharged through an exhaust manifold 34 and into the exhaust system 14 where it is processed to remove suspended particulate, NOx gasses, hydrocarbons, etc. Energy released by the combustion of fuel 28 produces torque, which is ultimately applied to a rotatable input member 36 of a transmission 38. Transmission 38 in turn transfers torque to a rotatable output member 40 in order to propel the vehicle 10 via a set of wheels 42, only one of which is shown in FIG. 1 for simplicity.

The SCR model 55 generates estimated output values for the SCR device 16, e.g., estimated NOx levels, $NH_3$ storage levels in the SCR device, etc., based on various control inputs. The control inputs may include actual NOx levels (arrow 19) as measured by the NOx sensor 25 downstream of the SCR device 16. Other control inputs may include O2 levels, the mass flow rate of the exhaust gas 13, the temperature of the exhaust gas at different points of the exhaust system 14, etc. First controller 50 compares the actual levels of NOx gasses from the NOx sensor 25 to its own modeled or estimated levels of NOx gasses, and then continuously updates, corrects, or otherwise adapts the SCR model 55 in a continuous closed loop when output values from the SCR model diverge from the actual values.

Updating may force an increase or decrease in $NH_3$ levels actually stored within the SCR device 16. For example, if the SCR model 55 predicts a NOx level of 20 parts per million (ppm) downstream of the SCR device 16 and the NOx sensor 25 determines an actual level of 50 ppm, either directly or in combination with $NH_3$, then an insufficient amount of NOx gasses are being converted by the SCR device. Controller 50 therefore must determine the makeup of the actual level signal and adapt the SCR model 55 accordingly. That is, the first controller 50 can update the SCR model 55 so that $NH_3$ storage levels are adjusted, i.e., by decreasing estimated $NH_3$ storage levels so that less $NH_3$ is present in the SCR device 16, which naturally allows the NOx levels to increase to approach the modeled or estimated levels.

Of course, the increase in estimated NOx levels in turn may require further updating of the SCR model 55 by the first controller 50 to cause the estimated $NH_3$ storage levels to increase, and so on. That is, the first controller 50 is considered to be an active or unlimited controller, and therefore the second controller 60 is used as set forth herein to generate and apply a calibrated threshold such as the upper and lower boundary models 70 and 80 to evaluate when the first controller is excessively updating the SCR model. Excessive updating may indicate a systematic problem worth investigating further, e.g., a faulty injector or other problem, which absent the second controller 60 might remain undetected for a time.

Figure 2:
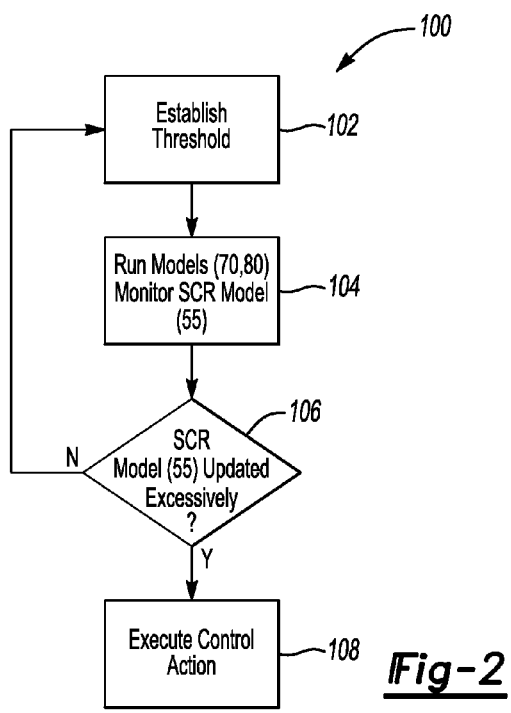
FIG. 2 is a flow chart describing a method for diagnosing the exhaust system shown in FIG. 1 by evaluating the updating frequency of the SCR model.

Referring to FIG. 2, algorithm 100 is automatically executed by the second controller 60 in order to automatically evaluate when the frequency of updating of the SCR model 55 by the first controller 50 is excessive with respect to a calibrated threshold, e.g., by comparing modeled $NH_3$ storage levels from the SCR model 55 to the modeled limits provided by the boundary models 70 and 80. The second controller 60 can execute a suitable control action when excessive updating by the first controller 50 is evaluated as present by the second controller.

Beginning with step 102, the second controller 60 generates or otherwise establishes the calibrated threshold. Step 102 may include generating and applying the upper and lower boundary models 70 and 80. In one embodiment, models 70 and 80 may be simplified single-brick SCR models, with each model applying a fixed calibrated biasing level for modeled or estimated $NH_3$ storage levels in the SCR device 16. For example, NOx, $NH_3$, and/or temperature input levels taken from the SCR model 55 may be biased by a calibrated positive percentage or multiplier in the upper boundary model 70, and by the negative of the same calibrated value in the lower boundary model 80.

To prevent drift of the boundary models 70 and 80, in another embodiment the upper and lower boundary models 70 and 80 may be zeroed upon passage of a calibrated duration or time interval. As used herein, the term "zeroed" means resetting the model state of boundary models 70 and 80 to match the SCR model 55, with the boundary models then allowed to run without updating for a calibrated duration, e.g., 100 seconds while the SCR model 55 is continuously updated by the first controller 50 over the same interval.

At step 104, the upper and lower boundary models 70 and 80 are allowed to run while the SCR model 55 of the first controller 50 is monitored with respect to the boundary models over the calibrated period from step 102. The boundary models 70 and 80 are essentially fed fictitious input signals, e.g., the biased input signals from step 102, that ultimately drive the estimated $NH_3$ storage levels at a calibrated high-end (via upper boundary model 70) and a calibrated low-end (via lower boundary model 80) of $NH_3$ consumption. Again, while the SCR model 55 is continuously corrected or updated by the first controller 50, the respective upper and lower boundary models 70 and 80 are not corrected during the calibrated duration.

At step 106, the second controller 60 determines whether the SCR model 55 is being excessively updated by the first controller 50 with respect to the calibrated threshold of step 102. For example, step 106 may entail comparing the modeled or estimated $NH_3$ storage levels from the SCR model 55 to the modeled or estimated $NH_3$ storage levels from the upper and lower boundary models 70 and 80 of the second controller. If the SCR model 55 does not approach the fictitious limits demarcated by the boundary models 70 and 80, the algorithm 100 repeats step 102. Otherwise, the algorithm 100 proceeds to step 108.

At step 108, the second controller 60 executes a control action indicating that the SCR model 55 is being excessively updated. Such a result may indicate a correctable hardware problem such as injector drift. Therefore, if the SCR model 55 is corrected in a manner that some of its output values, e.g., estimated $NH_3$ storage levels, exceed corresponding values provided by boundary models 70 and 80 within the calibrated duration from step 102, then the second controller 60 may set a flag or a vehicle diagnostic code, and/or transmit a message within the vehicle 10 and/or external to the vehicle, and/or activate an optional indicator device 90 (see FIG. 1) as possible control actions.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine;
an exhaust system having a selective catalytic reduction (SCR) device which receives exhaust gas from the engine and reduces nitrogen oxide (NOx) gasses in the exhaust gas;
a NOx sensor which measures an actual level of NOx gasses at a position downstream of the SCR device;
a first controller having an SCR model which provides a set of output values including an estimated level of NOx gasses downstream of the SCR device, wherein the first controller compares the estimated level of NOx gasses from the SCR model to the actual level of NOx gasses from the NOx sensor, and automatically updates the SCR model when the estimated and the measured levels of NOx gasses differ from each other; and
a second controller which determines an updating frequency of the SCR model, wherein the updating frequency indicates how frequently the SCR model has been automatically updated by the first controller over a calibrated duration, and diagnoses an operation of the exhaust system by automatically evaluating the updating frequency of the SCR model conducted by the first controller with respect to at least one calibrated threshold, wherein the second controller executes a control action when the updating frequency is evaluated by the second controller as exceeding the at least one calibrated threshold.

2. The vehicle of claim 1, wherein the second controller evaluates the updating frequency of the SCR model by formulating separate upper and lower boundary models, neither of which is updated during the calibrated duration, and by comparing an output value from the set of output values to corresponding output values from the upper and lower boundary models, wherein the output value is multiplied by a calibrated positive percentage or multiplier in the upper boundary model and by a negative of the same calibrated positive percentage or multiplier in the lower boundary model to generate corresponding upper and lower calibrated thresholds as the at least one calibrated threshold.

3. The vehicle of claim 2, wherein the output value from the SCR model is an estimated storage level of ammonia ($NH_3$) in the SCR device, and wherein the second controller evaluates the updating frequency by comparing a modeled level of $NH_3$ in the SCR device from each of the upper and the lower boundary models to the estimated storage level of $NH_3$ from the SCR model.

4. The vehicle of claim 3, wherein the output value from the SCR model is one of an estimated $NH_3$ level in the SCR device, a NOx level downstream of the SCR device, and a temperature value upstream or downstream of the SCR device.

5. The vehicle of claim 1, wherein the control action includes setting a vehicle diagnostic code.

6. The vehicle of claim 2, wherein the second controller automatically zeroes the upper and the lower boundary models after the calibrated duration.

7. A control system for a vehicle having an engine and a selective catalytic reduction (SCR) device which receives exhaust gas from the engine and reduces a level of nitrogen oxide ($NO_x$) gasses in the exhaust gas, the control system comprising:
a NOx sensor positioned downstream of the SCR device;
a first controller having an SCR model which provides estimated levels of NOx gasses in the SCR device, wherein the first controller compares the estimated level of NOx gasses from the SCR model to actual levels of NOx gasses as measured by the downstream NOx sensor, and automatically updates the SCR model when the estimated and the actual levels of NOx gasses differ from each other; and
a second controller which determines an updating frequency of the SCR model, wherein the updating frequency indicates how frequently the SCR model has been automatically updated by the first controller over a calibrated duration, and which evaluates the updating frequency of the SCR model conducted by the first controller and executes a control action when the updating frequency is evaluated by the second controller as exceeding at least one calibrated threshold.

8. The control system of claim 7, wherein the second controller includes an upper ammonia ($NH_3$) boundary model and a lower $NH_3$ boundary model, neither of which is updated during the calibrated duration and each of which generates a respective upper and lower $NH_3$ storage level boundary for the SCR device, and wherein the second controller determines the updating frequency by comparing an estimated $NH_3$ storage level from the SCR model to a corresponding estimated $NH_3$ storage level from each of the upper and the lower $NH_3$ storage level boundary models.

9. The control system of claim 8, wherein each of the upper and the lower $NH_3$ boundary models applies a calibrated multiplier to the estimated $NH_3$ storage levels from the SCR model to generate corresponding upper and lower calibrated thresholds as the at least one calibrated threshold.

10. The control system of claim 8, wherein the second controller zeroes the upper and lower $NH_3$ boundary models after the calibrated duration.

11. The control system of claim 7, wherein the control action includes setting a vehicle diagnostic code.

12. A method of diagnosing performance of an exhaust system in a vehicle having an engine, a nitrogen oxide (NOx) sensor, a first controller, and a second controller, the exhaust system including a selective catalytic reduction (SCR) device, the method comprising:
measuring an actual level of NOx gasses downstream of the SCR device;
estimating a level of NOx gasses using an SCR model and the first controller;
comparing the estimated level of NOx gasses from the SCR model to the actual level of NOx gasses from the NOx sensor using the first controller;
updating the SCR model via the first controller when the estimated and the actual level of NOx gasses differ from each other;
determining an updating frequency of the SCR model, wherein the updating frequency indicates how frequently the SCR model has been automatically updated by the first controller over a calibrated duration;
using the second controller to diagnose a performance of the exhaust system by automatically evaluating an updating frequency of the SCR model conducted by the first controller with respect to at least one calibrated threshold; and
executing a control action when the updating frequency is evaluated by the second controller as exceeding the at least one calibrated threshold.

13. The method of claim 12, further comprising:
using the second controller to generate respective upper and lower $NH_3$ storage level boundaries for the SCR device via a respective pair of $NH_3$ boundary models, wherein the upper and lower $NH_3$ storage level boundaries provide the at least one calibrated threshold; and
comparing the estimated $NH_3$ levels from the SCR model to the upper and lower $NH_3$ storage level boundaries to determine whether the first controller is excessively updating the SCR model.

14. The method of claim 12, wherein executing the control action includes setting a diagnostic code.

15. The method of claim 13, further comprising zeroing the pair of $NH_3$ boundary models after the calibrated duration.

16. The method of claim 13, wherein using the second controller to generate respective upper and lower $NH_3$ storage level boundaries for the SCR device includes applying a calibrated multiplier to a designated output value from the SCR model to generate the corresponding upper and lower $NH_3$ storage level boundaries.

* * * * *